C. F. BILLAU.
WEEDER.
APPLICATION FILED OCT. 6, 1909.

952,697.

Patented Mar. 22, 1910.

Witnesses
L. A. St. John.
Ira Andre.

Inventor
Charles F. Billau
By J. M. St. John
Atty

UNITED STATES PATENT OFFICE.

CHARLES FREDERICK BILLAU, OF CEDAR RAPIDS, IOWA.

WEEDER.

952,697. Specification of Letters Patent. Patented Mar. 22, 1910.

Application filed October 6, 1909. Serial No. 521,339.

*To all whom it may concern:*

Be it known that I, CHARLES FREDERICK BILLAU, a citizen of the United States, residing at Cedar Rapids, in the county of Linn and State of Iowa, have invented certain new and useful Improvements in Weeders, of which the following is a specification.

This invention relates to weeders of the type described in my Letters Patent No. 933,227, issued Sept. 7, 1909; and the object of this invention is to provide a weeder of simpler and cheaper construction, embodying the main features of the invention above referred to.

The nature of this invention is fully disclosed in the description and claims following, reference being had to the accompanying drawings, in which—

Figure 1:
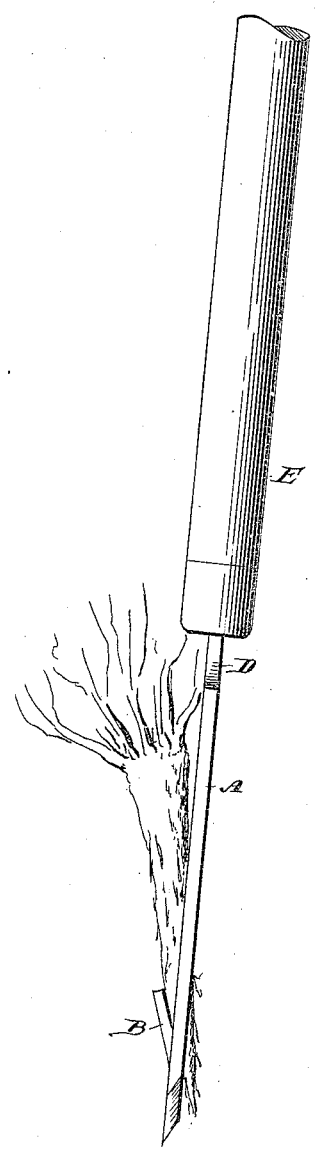
Figure 2:
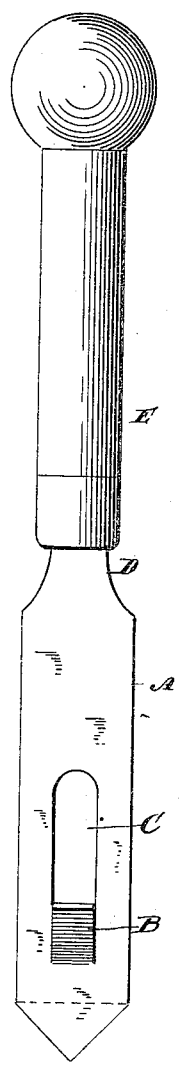
Figure 5:
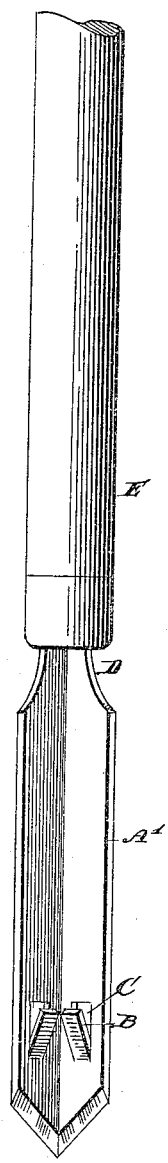

Figure 1 is a side view of the weeder embodying my improvements in a very simple form. Fig. 2 is a front view of the same, with a short handle. Fig. 3 is a front view of a modification, showing angled construction.

In the drawing A designates a blade of steel, which should be sharp at the end, so as to easily penetrate the ground. Preferably the edge is angled, as shown in the full outlines, but might be chisel-shaped, as indicated by the dotted line across Fig. 2. Near the lower end is a tang B, inclined upwardly, and projecting out some distance from the face of the blade, at the upper end of the tang. Preferably this is punched out of the body of the blade, and the punching may be extended upward some distance above the tang, as shown in Fig. 2. This extension of the slot C is useful in preventing the accumulation of dirt behind the tang, and also permits the weed-root to slip part way through the blade, as shown in Fig. 1, thus giving the blade a better hold on the root and insuring its being drawn out bodily. The construction shown in Fig. 3 is practical, however, and particularly if the blade be formed of angled steel, $A^1$, since the angle behind the tangs serves the same purpose of catching the root and holding it firmly while being drawn out of the ground. A suitable shank D is formed at the upper end of the blade, as by shearing off a part of the stock, and to this is attached a suitable handle E, long or short, as desired.

The device is an efficient weeder in either form, but the principal advantage arising from this construction is in the matter of manufacture, inasmuch as the blade may be formed by a simple punch and shears from regular market steel, either flat or angled, and without the need of special dies to curve or otherwise form the blade.

Having thus described my invention, I claim:

1. A weeder, comprising a flat blade with a lateral, upwardly inclined tang springing from one face thereof, a hole through the blade behind said tang, and a handle for said blade.

2. A weeder having a plurality of flat blade members at divergent angles, with lateral, upwardly inclined tangs springing from the blades, openings in the blades behind the tangs, and a handle for said blades.

In testimony whereof I affix my signature in presence of two witnesses.

CHARLES FREDERICK BILLAU.

Witnesses:
J. M. ST. JOHN,
IRA ANDRE.